US010882387B2

(12) United States Patent
Hummel

(10) Patent No.: US 10,882,387 B2
(45) Date of Patent: Jan. 5, 2021

(54) HYBRID DRIVE TRAIN FOR A HYBRID-DRIVE MOTOR VEHICLE

(71) Applicant: AUDI AG, Ingolstadt (DE)

(72) Inventor: Steffen Hummel, Flacht (DE)

(73) Assignee: AUDI AG, Ingolstadt (DE)

( * ) Notice: Subject to any disclaimer, the term of this patent is extended or adjusted under 35 U.S.C. 154(b) by 14 days.

(21) Appl. No.: 16/343,844

(22) PCT Filed: Oct. 24, 2017

(86) PCT No.: PCT/EP2017/077206
§ 371 (c)(1),
(2) Date: Apr. 22, 2019

(87) PCT Pub. No.: WO2018/077904
PCT Pub. Date: May 3, 2018

(65) Prior Publication Data
US 2019/0263247 A1 Aug. 29, 2019

(30) Foreign Application Priority Data
Oct. 26, 2016 (DE) .......... 10 2016 221 060

(51) Int. Cl.
B60K 6/48 (2007.10)
B60K 6/36 (2007.10)
(Continued)

(52) U.S. Cl.
CPC .......... B60K 6/36 (2013.01); B60K 6/48 (2013.01); B60K 6/547 (2013.01); F16H 3/093 (2013.01);
(Continued)

(58) Field of Classification Search
CPC .... B60K 2006/4841; B60K 6/36; B60K 6/48; B60K 6/547; F16H 3/093;
(Continued)

(56) References Cited

U.S. PATENT DOCUMENTS 6,634,247 B2 * 10/2003 Pels .......... B60K 6/26
74/329
7,798,030 B2 * 9/2010 Lang .......... F16H 61/688
74/331
(Continued)

FOREIGN PATENT DOCUMENTS

DE 197 45 995 A1 9/1998
DE 103 29 109 A1 1/2004
(Continued)

OTHER PUBLICATIONS

Machine translation of WO2014006016 filed Jul. 2, 2020 (Year: 2020).*

(Continued)

Primary Examiner — Tisha D Lewis
(74) Attorney, Agent, or Firm — Maier & Maier, PLLC

(57) ABSTRACT

A hybrid drive train for a hybrid-drive vehicle. A transmission which can be shifted to different gear ratios by shifting components, and which can be drivingly connected to an internal combustion engine via an internal combustion engine shaft, to an electric motor via an electric motor shaft, and to at least one vehicle axle via an output shaft. The internal combustion engine shaft and a power takeoff shaft that is drivingly connected to the output shaft can be connected via spur gear wheel sets, which can be selected by the shifting components and each of which forms a gear plane. The gear planes include a first and a second hybrid gear plane, each of which can additionally be drivingly connected to the electric motor shaft.

15 Claims, 4 Drawing Sheets

(51) Int. Cl.
*B60K 6/547* (2007.10)
*F16H 3/08* (2006.01)
*F16H 3/093* (2006.01)

(52) U.S. Cl.
CPC ............ *B60K 2006/4841* (2013.01); *F16H 2003/0826* (2013.01); *F16H 2003/0933* (2013.01); *F16H 2200/0069* (2013.01); *Y02T 10/62* (2013.01)

(58) Field of Classification Search
CPC ..... F16H 2003/0826; F16H 2003/0933; F16H 2200/0069
See application file for complete search history.

(56) References Cited

U.S. PATENT DOCUMENTS

| | | | | |
|---|---|---|---|---|
| 8,978,516 | B2* | 3/2015 | Funk | B60K 6/547 74/665 A |
| 9,003,907 | B2* | 4/2015 | Weller | B60K 6/48 74/331 |
| 9,541,180 | B2* | 1/2017 | Kaltenbach | F16H 37/065 |
| 2011/0190084 | A1* | 8/2011 | Zerbato | B60K 6/40 475/5 |

FOREIGN PATENT DOCUMENTS

| | | | | |
|---|---|---|---|---|
| DE | 602 12 220 T2 | | 4/2007 | |
| DE | 102006036758 A1 | * | 2/2008 | ......... F16H 61/0403 |
| DE | 10 2008 031 456 A1 | | 1/2010 | |
| DE | 102010028026 A1 | * | 10/2011 | ......... B60W 10/115 |
| DE | 10 2010 030 567 A1 | | 12/2011 | |
| DE | 10 2011 101 151 A1 | | 12/2011 | |
| DE | 11 2012 003 012 T5 | | 5/2014 | |
| DE | 10 2013 005 252 A1 | | 10/2014 | |
| DE | 10 2013 206 176 A1 | | 10/2014 | |
| DE | 10 2013 210 013 A1 | | 12/2014 | |
| DE | 10 2014 013 579 A1 | | 3/2015 | |
| EP | 2 056 391 A1 | | 5/2009 | |
| EP | 2 204 894 A1 | | 7/2010 | |
| EP | 2 792 523 A2 | | 10/2014 | |
| EP | 2 808 197 A1 | | 12/2014 | |
| GB | 2506601 A | * | 4/2014 | ............ B60K 6/547 |
| WO | 2008/138387 A1 | | 11/2008 | |
| WO | 2010/047207 A1 | | 4/2010 | |
| WO | 2011/002921 A2 | | 1/2011 | |
| WO | WO-2014006016 A1 | * | 1/2014 | .............. B60K 6/48 |
| WO | 2014/166745 A1 | | 10/2014 | |
| WO | 2015/140617 A1 | | 9/2015 | |

OTHER PUBLICATIONS

International Preliminary Report on Patentability and translation of Written Opinion dated May 9, 2019 in corresponding International Application No. PCT/EP2017/077206; 11 pages.
Examination Report dated Jul. 14, 2017 of corresponding German application No. 10 2016 221 060.2; 18 pages.
International Search Report and Written Opinion of the International Searching Authority dated Jan. 23, 2018 in corresponding International application No. PCT/EP2017/077206; 31 pages.

* cited by examiner

HYBRID DRIVE TRAIN FOR A HYBRID-DRIVE MOTOR VEHICLE

FIELD

The invention relates to a hybrid drive train for a hybrid-drive motor vehicle.

BACKGROUND

From EP 2792523 A2, a generic hybrid drive train for a hybrid-drive vehicle is known. Said drive train has a transmission that can be shifted to different gear ratios by means of shifting components and can be drivingly connected to an internal combustion engine via an internal combustion engine shaft, to an electric motor via an electric motor shaft, and to at least one vehicle axle via an output shaft. The internal combustion engine shaft can be connected to a drive shaft via spur gear wheel sets that form gear planes. Said drive shaft in turn drives the output shaft via a spur gear stage. The gear planes of the hybrid transmission include a hybrid gear plane, which is drivingly connected to the electric motor shaft.

SUMMARY

The object of the invention is to provide a hybrid drive train that offers a greater degree of freedom in terms of functionality in a structurally favorable design that is structurally simple as compared with the prior art.

According to disclosure, gear planes V1 to V4, E1, E2 include a first and a second hybrid gear plane E1, E2. These can additionally be drivingly connected to the electric motor shaft and are configured such that the electric motor can be connected to the internal combustion engine via the first hybrid gear plane E1, forming a first load path L1. Alternatively, the electric motor can be connected to the internal combustion engine, forming a second load path L2. When the first or the second load path L1, L2 is selected, the power takeoff shaft connected to the output shaft is decoupled from the respective load path L1, L2.

The first load path L1 may be designed for an idle charging mode, for example, in which the internal combustion engine is connected to the electric motor in a torque flow direction via the first hybrid gear plane E1. In that case, the first hybrid gear plane E1 is configured such that there is a high gear ratio from the internal combustion engine to the electric motor.

In contrast, the second load path L2 may be designed for an internal combustion engine start-up in which the electric motor is connected to the internal combustion engine in a torque flow direction via the second hybrid gear plane E2. In that case, the second hybrid gear plane E2 is configured such that there is a high gear ratio from the electric motor to the internal combustion engine.

In addition, the first and second hybrid gear planes E1, E2 are able to provide electric motor gear ratios with high torque for start-up and with long gear ratios for high speeds. Moreover, the first and second hybrid gear planes E1, E2 are able to provide electric motor gear ratios for boost operation from the electric motor to the vehicle wheel and for recuperation operation from the vehicle wheel to the electric motor.

In a practical implementation, each hybrid gear plane E1, E2 can be composed of a power takeoff-side gear wheel arranged on the power takeoff shaft, a drive-side gear wheel arranged on the internal combustion engine shaft and a gear wheel arranged on the electric motor shaft.

The gear wheel arranged on the electric motor shaft can be mounted rotatably as an idler gear wheel on the electric motor shaft and can be decoupled from the electric motor shaft or coupled thereto by means of the shifting component SE-A.

The shifting component SE-A arranged on the electric motor shaft can be shifted bilaterally and can be arranged between the idler gear wheels of the two hybrid gear planes E1, E2 in the axial direction. The shifting component SE-A, in a first shifting position, can couple the idler gear wheel of the first hybrid gear plane E1 to the electric motor shaft or, in a second shifting position, can couple the idler gear wheel of the second hybrid gear plane E2 to the electric motor shaft.

Preferably, no fixed gear wheels of the spur gear wheel sets that form the gear planes of the transmission are arranged in a torque-proof manner on the electric motor shaft.

It is further preferable for the transmission to be configured as a purely spur gear transmission, in which the internal combustion engine shaft, the electric motor shaft, and the output shaft can be connected drivingly to one another solely via spur gear wheel sets. A transmission structure of simple design is thereby achieved, which can be operated much more efficiently than a planetary gear set.

In a further preferred embodiment, the two hybrid gear planes can be immediately adjacent to one another in the axial direction and can be combined to form a common partial transmission T, which is disengaged, i.e., decoupled from the drive train, in transmission mode. To achieve such a partial transmission T, each of the hybrid gear planes E1, E2 may have a power takeoff-side gear wheel arranged on the power takeoff shaft, which gear wheel is configured as an idler gear wheel and can be coupled to the power takeoff shaft by means of a shifting component SE-B. In addition, the drive-side gear wheels of the two hybrid gear planes E1, E2, arranged on the internal combustion engine shaft, can also be embodied as idler gear wheels. These are preferably arranged together in a torque-proof manner on a drive-side hollow shaft that is mounted rotatably and coaxially on the internal combustion engine shaft and can be coupled to the internal combustion engine shaft via precisely one shifting component, specifically SE-C. The aforementioned shifting component SE-B arranged on the power takeoff shaft can be embodied as bilaterally shiftable and can be arranged between the power takeoff-side idler gear wheels of the two hybrid gear planes E1, E2 in the axial direction.

In a second preferred embodiment, hybrid gear planes E1, E2 can be combined respectively with additional gear planes V3. V4 to form a first and a second partial transmission T1, T2, respectively. The first and second partial transmissions T1, T2 can be deactivated, i.e., decoupled from the drive train or disengaged, in the transmission mode. In contrast to the hybrid gear planes E1, E2, the aforementioned additional gear plane has no linkage to the electric motor shaft and has a power takeoff-side idler gear wheel that is mounted rotatably on the power takeoff shaft and can be coupled to the power takeoff shaft by means of a shifting component SE-D. SE-E. It is preferable for the shifting component SE-D, SE-E arranged on the power takeoff shaft to be bilaterally shiftable and to be arranged in the axial direction between the power takeoff-side idler gear wheels of the hybrid gear plane E1, E2 and of the additional gear plane V3, V4, which gear wheels are mounted rotatably on the power takeoff shaft.

The aforementioned additional gear plane V3, V4 may also include a drive-side idler gear wheel mounted rotatably on the internal combustion engine shaft. Said idler gear wheel can be coupled to the internal combustion engine shaft by means of a shifting component SE-F. It is particularly preferable for the drive-side idler gear wheels of the respective hybrid gear plane E1, E2 and of the additional gear plane V3, V4, said idler gear wheels being mounted rotatably on the internal combustion engine shaft, to be arranged in a torque-proof manner on a common drive-side hollow shaft, which is rotatably mounted coaxially on the internal combustion engine shaft and can be coupled to the internal combustion engine shaft via precisely one shifting component SE-F.

Preferably, the shifting component SE-F arranged on the internal combustion engine shaft can be shifted bilaterally and can be arranged between the drive-side hollow shafts of the two partial transmissions T1, T2 in the axial direction.

The shifting component arranged on the electric motor shaft can be implemented as desired, for example as a powershift one-way clutch combined with a clutch, as a powershift double clutch, or as a non-powershift double synchronizer. In addition, the electric motor may be tied in to the transmission on the drive side or on the power takeoff side. With a drive-side tie-in, the gear wheel of the hybrid gear plane E1, E2, arranged on the electric motor shaft, can mesh with a drive-side idler gear wheel mounted rotatably on the internal combustion engine shaft. With a power takeoff-side tie-in, the gear wheel of the hybrid gear plane E1, E2, arranged on the electric motor shaft, can mesh with a power takeoff-side idler gear wheel mounted rotatably on the power takeoff shaft.

The above hybrid concept can be implemented in a simple manner based on a conventional manual transmission and can be used especially for front-wheel drive. The rear axle can optionally be mechanically decoupled from the front axle, but can be driven by separate electric motors in order to achieve a four-wheel drive. In the above hybrid concept, the electric motor can preferably be positioned at the end of the transmission.

The advantageous embodiments and/or refinements of the invention described above and/or specified in the dependent claims may be used individually or in any desired combination with one another except, for example, in the case of clear dependencies or incompatible alternatives.

BRIEF DESCRIPTION OF THE DRAWINGS

In the following, the invention and its advantageous embodiments and refinements along with the advantages thereof will be described in greater detail with reference to the drawings.

In the drawings.

DETAILED DESCRIPTION

Figure 1:
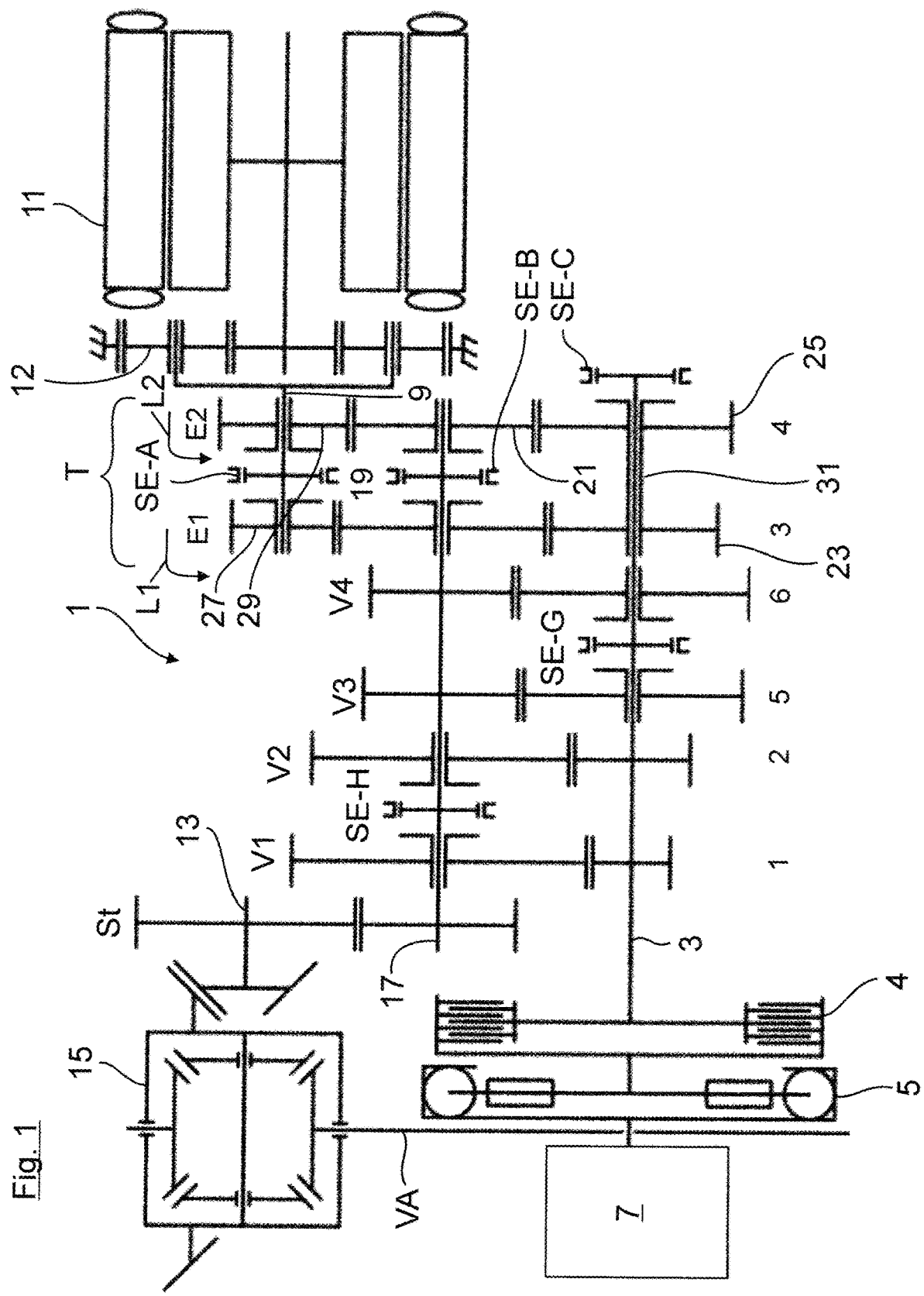
FIG. 1 shows a transmission structure of a hybrid transmission configured as a spur-gear manual transmission.

FIG. 1 shows a manual transmission 1, which is a component of a hybrid drive train of a hybrid-drive motor vehicle (not shown). Transmission 1, which can be shifted to different gear ratios by means of shifting components, is connected via an internal combustion engine shaft 3, with interposed separating clutch 4 and torsion damper 5, to an internal combustion engine 7, and is connected via an electric motor shaft 9 to an electric motor 11. For torque conversion, the electric motor 11 may include a planetary reduction gear unit 12, shown in FIG. 1. In addition, transmission 1 is drivingly connected on the output side to a front axle VA of the motor vehicle via an output shaft 13. Output shaft 13 is a pinion shaft, operatively connected to the bevel gear of a front axle differential 15.

As is further apparent from FIG. 1, internal combustion engine shaft 3, electric motor shaft 9, and an interposed power takeoff shaft 17 are arranged axially parallel to one another. Power takeoff shaft 17, electric motor shaft 9, and output shaft 13 can be drivingly connected to one another via spur gear wheel sets that can be selected via the shifting components. The spur gear wheel sets form mutually parallel gear planes V1 to V4 and E1 and E2, which according to FIG. 1 are all located between internal combustion engine 7 and electric motor 11 in the axial direction.

In the following, the transmission structure of hybrid transmission 1 depicted in FIG. 1 will be described: In FIG. 1, internal combustion engine shaft 3 and power takeoff shaft 17 are connected to one another via gear planes V1 to V4, which are each composed of intermeshing idler gear wheels and fixed gear wheels. The idler gear wheels of gear planes V1 to V4 can be coupled via shifting components SE-H and SE-G to the respective supporting shafts 3, 17. Gear planes V1 to V4 have no tie-in to electric motor shaft 9.

In addition, two hybrid gear planes E1, E2 are provided. Each hybrid gear plane E1, E2 has a power takeoff-side gear wheel 19, 21 arranged on the power takeoff shaft 17, each of which meshes with a drive-side gear wheel 23, 25 arranged on the internal combustion engine shaft 3 and with an (electric motor-side) idler gear wheel 27, 29 arranged coaxially to the electric motor shaft 9. The drive-side gear wheels 23, 25 of the hybrid gear planes E1, E2 are mounted rotatably as idler gear wheels on the internal combustion engine shaft 3. Between the electric motor-side idler gear wheels 27, 29 of the hybrid gear planes E1, E2, a bilaterally shiftable shifting component SE-A is located, with which either the first hybrid gear plane E1 or the second hybrid gear plane E2 can be coupled to the electric motor shaft 9. The power takeoff shaft 17 drives the output shaft 13 via a spur gear stage St.

In the neutral position of the shifting component SE-A shown in FIG. 1, the electric motor shaft 9 is decoupled from the drive train. In this way, the electric motor shaft 9 is disengaged, i.e., deactivated, in transmission mode. This advantageously reduces the moment of inertia of the remaining activated transmission. However, the gears of the hybrid gear planes E1, E2 remain activated, i.e., they are co-rotated in transmission mode, even though the electric motor 11 is disengaged.

In FIG. 1, the two hybrid gear planes E1, E2 are combined to form a common partial transmission T, which in transmission mode can be shifted to a completely torque-free state, i.e., it can be completely decoupled from the drive train, so that the partial transmission T is completely disengaged. To achieve the partial transmission T, in FIG. 1 the two power takeoff-side gears 19, 21 of the hybrid gear planes E1, E2 are mounted rotatably as idler gear wheels on the power takeoff shaft 17. Between the two power takeoff-side gear wheels 19, 21 of the hybrid gear planes E1 and E2, a shifting component SE-B is located, which can be shifted bilaterally and can couple either the first or the second hybrid gear plane E1, E2 to the power takeoff shaft. Also in FIG. 1, the two drive-side idler gear wheels 23, 25 of the hybrid gear planes E1, E2 are arranged together in a torque-proof manner on a drive-side hollow shaft 31, which is rotatably mounted coaxially on the internal combustion engine shaft 3. The drive-side hollow shaft 31 can be coupled with a reduced number of components via exactly one shifting component SE-C to the internal combustion engine shaft 3.

Figure 2:
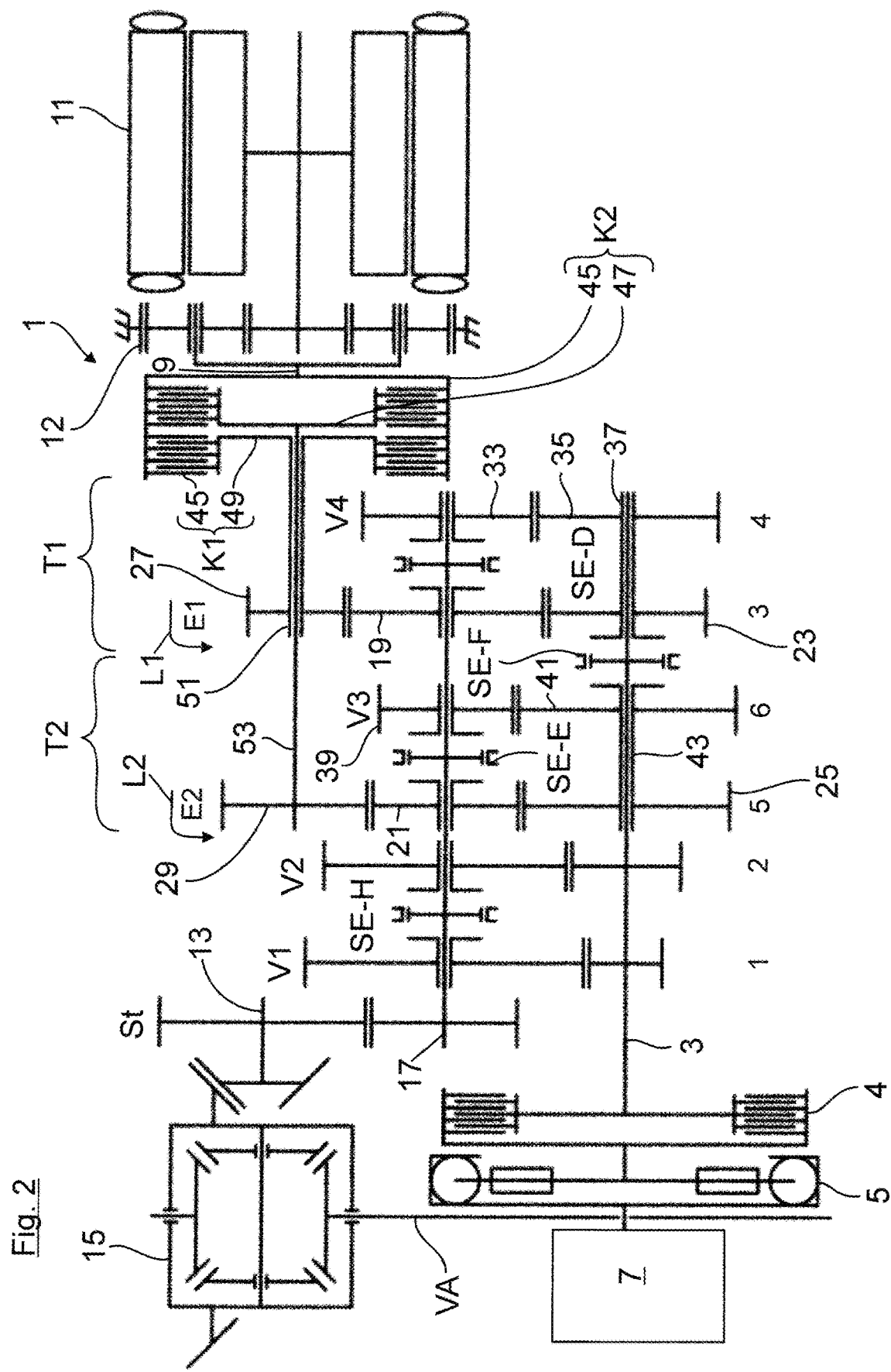
FIG. 2 shows a second exemplary embodiment of the hybrid transmission, in a view corresponding to that of FIG. 1.

In FIG. 2, in contrast to FIG. 1, a total of two partial transmissions T1, T2 are provided, each of which can be shifted to a completely torque-free state, i.e., can be decoupled completely from the drive train, during transmission operation, so that the first partial transmission T1 and/or the second partial transmission T2 is completely disengaged. In the first partial transmission T1, the first hybrid gear plane E1 and an additional gear plane V4 immediately adjacent to the first axially are combined. In the second partial transmission T2, the second hybrid gear plane E2 and an immediately adjacent additional gear plane V3 are combined with one another.

In the first partial transmission T1, gear plane V4 includes a power takeoff-side idler gear wheel 33 rotatably mounted on the power takeoff shaft 17. The power takeoff-side idler gear wheel 33 of gear plane V4 and the power takeoff-side idler gear wheel 19 of the first hybrid gear plane E1 can be coupled alternatingly to power takeoff shaft 17 via a shiftable shifting component SE-D disposed therebetween. Both the first hybrid gear plane E1 and gear plane V4 include drive-side idler gear wheels 23, 35, which are mounted rotatably on the internal combustion engine shaft 3 and which are arranged in a torque-proof manner together on a drive-side first hollow shaft 37. Said shaft is rotatably mounted coaxially on the internal combustion engine shaft 3 and can be coupled to internal combustion engine shaft 3 via a shifting component SE-F.

The second partial transmission T2 is identical in design to the first partial transmission T1. In the second partial transmission T2, gear plane V3 includes a power takeoff-side idler gear wheel 39 mounted rotatably on power takeoff shaft 17. The power takeoff-side idler gear wheel 39 of gear plane V3 and the power takeoff-side idler gear wheel 21 of the second hybrid gear plane E2 can be coupled alternatingly to power takeoff shaft 17 via a bilaterally shiftable shifting component SE-E disposed therebetween. Both the second hybrid gear plane E2 and gear plane V3 include drive side idler gear wheels 25, 41 mounted rotatably on the internal combustion engine shaft 3 and arranged together in a torque-proof manner on a drive side second hollow shaft 43, which is rotatably mounted coaxially on internal combustion engine shaft 3 and can be coupled to internal combustion engine shaft 3 via shifting component SE-F. The common shifting component SE-F for the two hollow shafts 37, 43 can be shifted bilaterally and is arranged between the two drive-side hollow shafts 37, 43.

As is further clear from FIG. 2, the two gear wheels 27, 29 of the hybrid gear planes E1, E2 on the electric motor side are shifted via a double clutch, composed of a first clutch K1 and a second clutch K2. The double clutch has an outer disk carrier 45 which is connected in a torque-proof manner to electric motor shaft 9. Outer disk carrier 45 interacts with two inner disk carriers 47, 49 arranged side by side in the axial direction. Inner disk carrier 49 is arranged, together with the electric motor-side gear wheel 27 of the first hybrid gear plane E1, in a torque-proof manner on a hollow shaft 51. In contrast, inner disk carrier 47 is arranged, together with gear wheel 29 of the second hybrid gear plane E2, in a torque-proof manner on a solid shaft 53, which extends coaxially through hollow shaft 51.

The transmission 1 shown in FIG. 2 has a total of 16 gear wheels, four synchronizers, and two clutches K1, K2. In transmission 1, up to ten internal combustion engine gears can be selected, i.e., the six internal combustion engine direct gears VM1 to VM6, described in the following, which use only one gear plane, and the four torsion gears VM7 to VM10, which use at least two gear planes:

In direct gears VM1 and VM2, the shifting component SE-H is shifted to the left or to the right while the two partial transmissions T1, T2 are disengaged.

In direct gear VM3, SE-F is shifted to the right and SE-D is shifted to the left. This means that partial transmission T1 is activated and partial transmission T2 is deactivated. The same applies to direct gear VM4, in which SE-F is shifted to the right and SE-D is likewise shifted to the right.

In the subsequent direct gears VM5 and VM6, partial transmission T2 is activated and partial transmission T1 is deactivated. In direct gear VM5, SE-F is shifted to the left and SE-E is shifted to the left. In direct gear VM6, SE-F is shifted to the left and SE-E is shifted to the right. Of the following four internal combustion engine torsion gears VM7 to VM10, in gear VM7, shifting component SE-F is shifted to the right, clutches K1 and K2 are activated, and shifting component SE-E is shifted to the left. In torsion gear VM8, SE-F is shifted to the right, the two clutches K1, K2 are activated, and SE-E is shifted to the right. In torsion gear VM9, SE-F is shifted to the left, the two clutches K1, K2 are activated, and SE-D is shifted to the left. In torsion gear VM10, SE-F is shifted to the left, the two clutches K1, K2 are activated, and SE-D is shifted to the right.

In the purely electric motor operation of transmission 1 shown in FIG. 2, up to 8 electric motor gears can be selected, i.e., the following two direct gears EM1, EM2 and the six torsion gears EM3 to EM8:

Thus, in direct gear EM1, clutch K1 is activated and shifting component SE-D is shifted to the left. In direct gear EM2, clutch K2 is activated and shifting component SE-E is shifted to the left. In electric motor torsion gear EM3, clutch K1 is activated and SE-D is shifted to the right. In torsion gear EM4, clutch K1 is activated and SE-F is shifted to the right and SE-H is shifted to the left. In torsion gear E5, clutch K1 is activated, SE-F is shifted to the right, and SE-H is shifted to the right. In torsion gear EM6, clutch K2 is activated and SE-E is shifted to the right. In torsion gear EM7, the second clutch K2 is activated, SE-F is shifted to the left, and SE-H is shifted to the left. In torsion gear E8, clutch K2 is activated, SE-F is shifted to the left, and SE-H is shifted to the right.

From the above internal combustion engine gears VM1 to VM10 and the electric motor gears EM1 to EM8, up to 28 hybrid gears can be implemented in combination by selecting electric motor and internal combustion engine gears in combination.

In the following, special driving modes are highlighted, which can be realized by means of the transmission shown in FIG. 2:

For instance, the transmission structure shown in FIG. 2 enables idle charging of the electric motor 11 as long as the vehicle is standing still, for example at a traffic light or in a traffic jam. In that case, for example, shifting component SE-F can be moved to the right to connect internal combustion engine shaft 3 to the first hybrid gear plane E1. At the same time, clutch K1 (consisting of outer disk carrier 45 and inner disk carrier 49) is closed to connect the first hybrid gear plane E1 to electric motor shaft 9. A load path L1 is thereby formed which conducts a flow of torque from internal combustion engine 7 via internal combustion engine shaft 3, the first hybrid gear plane E1, and the closed clutch K1 to electric motor 11.

In addition, the internal combustion engine can be started up with the aid of electric motor 11. Electric motor 11 can start internal combustion engine 7 via a load path L2, in which, for example, the second clutch K2 (consisting of outer disk carrier 45 and inner disk carrier 47) is closed and shifting component SE-F is moved to the left.

Also in FIG. 2, shifting between internal combustion engine gears 1 to 6 without any interruption of traction is possible with the aid of electric motor 11, e.g., with the aid of electric motor gears EM1, EM2, which act as supporting gears in the internal combustion engine shifting process. This type of shifting operation is started by opening the separating clutch 4 in order to decouple internal combustion engine 7 from transmission 1. An engaged electric motor supporting gear provides a supporting load path that extends from electric motor 11 to the drive side during the process of shifting between the internal combustion engine gears. During the shifting process (i.e., internal combustion engine 7 is decoupled from the drive train by means of separating clutch 4), electric motor 11 can thus generate a driving torque, which is transmitted via the supporting load path to the power takeoff side.

In the following, the above situation will be explained in the context of a process of shifting between the third and fourth internal combustion engine gears without an interruption of traction, in which the second electric motor gear EM2 acts as a supporting gear: For instance, in transmission 1 of FIG. 2, in the third internal combustion engine gear VM3, shifting component SE-F is shifted to the right and shifting component SE-D is shifted to the left. As a result, a load path extends from internal combustion engine 7 through partial transmission T1 and power takeoff shaft 17 to the power takeoff-side spur gear drive St, while partial transmission T2 is deactivated (disengaged). At the beginning of the shifting process, separating clutch 4 is released and shifting component SE-D is shifted to its neutral position. In addition, electric motor gear EM2, which acts as a supporting gear, is engaged, i.e., multi-disk clutch K2 is closed and shifting component SE-E is shifted to the left, and electric motor 11 is started up. This results in a load transmission from electric motor 11 to the power takeoff side, in which electric motor 11 generates an adjustable torque.

The process of shifting into target gear VM4 is continued by shifting the shifting component SE-D from its neutral position toward the right. This creates a load path from internal combustion engine 7 through shifting component SE-F, gear plane V4, shifting component SE-D, and power takeoff shaft 17 up to the power takeoff-side spur gear drive St. At the end of the shifting process, separating clutch 4 is closed again, i.e., internal combustion engine 7 is engaged and electric motor 11 is shut down again, so that target gear VM4 is engaged and once again, a load is transmitted from internal combustion engine 7 to the power takeoff side.

Therefore, in transmission 1 of FIG. 2, every shifting operation can be supported by an electric motor supporting gear, in contrast to FIG. 1, in which a shifting operation especially between the third internal combustion engine gear VM3 and the fourth internal combustion engine gear VM4, i.e., between the hybrid gear planes E1 and E2, cannot be supported by an electric motor gear. In the transmission 1 shown in FIG. 1, no supporting load path can be provided by electric motor 11 during the above shifting process, since both internal combustion engine 7 and electric motor 11 drive power takeoff shaft 17 via a common shifting component SE-B. Thus, in FIG. 1, shifting between the third and fourth internal combustion engine gears is not possible without an interruption in traction.

In addition, with the transmission 1 shown in FIG. 2, the vehicle can be started up from an idle state or can be operated in boost mode, in which multiple electric motor gears are available for boosting individual internal combustion engine gears.

Figure 3:
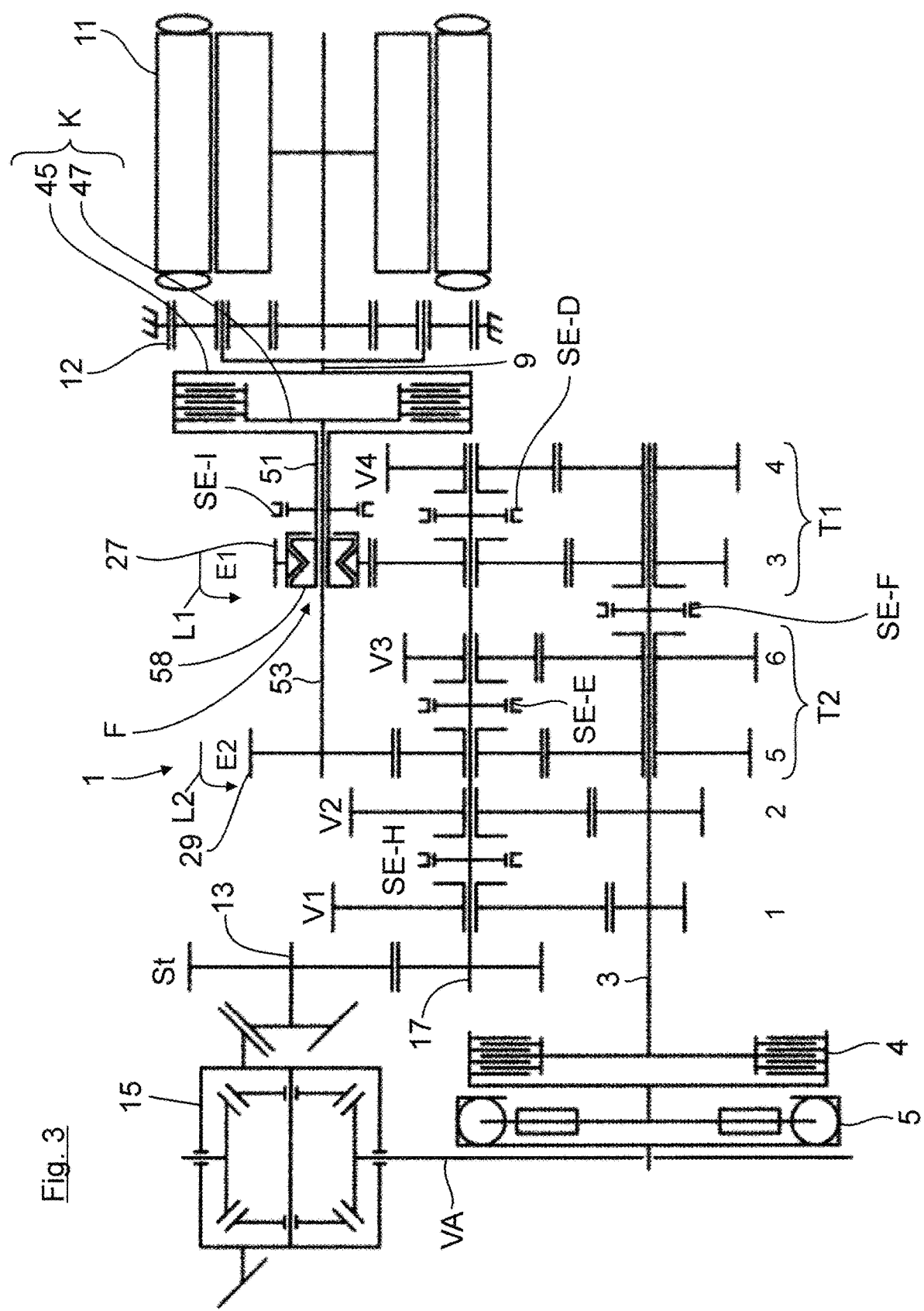
FIG. 3 shows a modification of FIG. 2.

Modifications of the transmission 1 shown in FIG. 3 will be described in reference to the following FIGS. 3 to 5:

For instance, in FIG. 3, the two electric motor-side gear wheels 27, 29 of the hybrid gear planes E1, E2 can be connected to electric motor shaft 9 not via a double clutch (FIG. 2) or via a double synchronizer (FIG. 2), but instead by means of a one-way clutch F and a multi-disk clutch K. The multi-disk clutch K comprises an outer disk carrier 45, which is connected in a torque-proof manner both to electric motor shaft 9 and to hollow shaft 51. Outer disk carrier 45 acts on an inner disk carrier 47. Said inner disk carrier is arranged in a torque-proof manner, together with gear wheel 29 of hybrid plane 1, on solid shaft 53, which extends coaxially through hollow shaft 51. The electric motor-side gear wheel 27 of the first hybrid gear plane E1 can be connected to hollow shaft 51 via the one-way clutch F. The one-way clutch F is assigned a shifting component SE-I, which can be shifted into two operating positions: In the operating position shown, a transmission of torque from electric motor shaft 9 via outer disk carrier 45 and via hollow shaft 51 in the direction of the electric motor-side gear wheel 27 of the first hybrid gear plane E1 is enabled, and in the opposite direction, the freewheeling function is activated, i.e., the transmission of torque is prevented. Therefore, when the one-way clutch inner side 58 connected to hollow shaft 51 rotates faster than the electric motor-side gear wheel 27, hollow shaft 51 will drive gear wheel 27. In a second operating position, the shifting component SE-I is shifted to the left in FIG. 3. In that case, torque transmission is enabled in both directions. In both FIG. 3 and FIG. 2, the electric motor gears are power shiftable, while in FIG. 1, the electric motor gears are not power shiftable.

Figure 4:
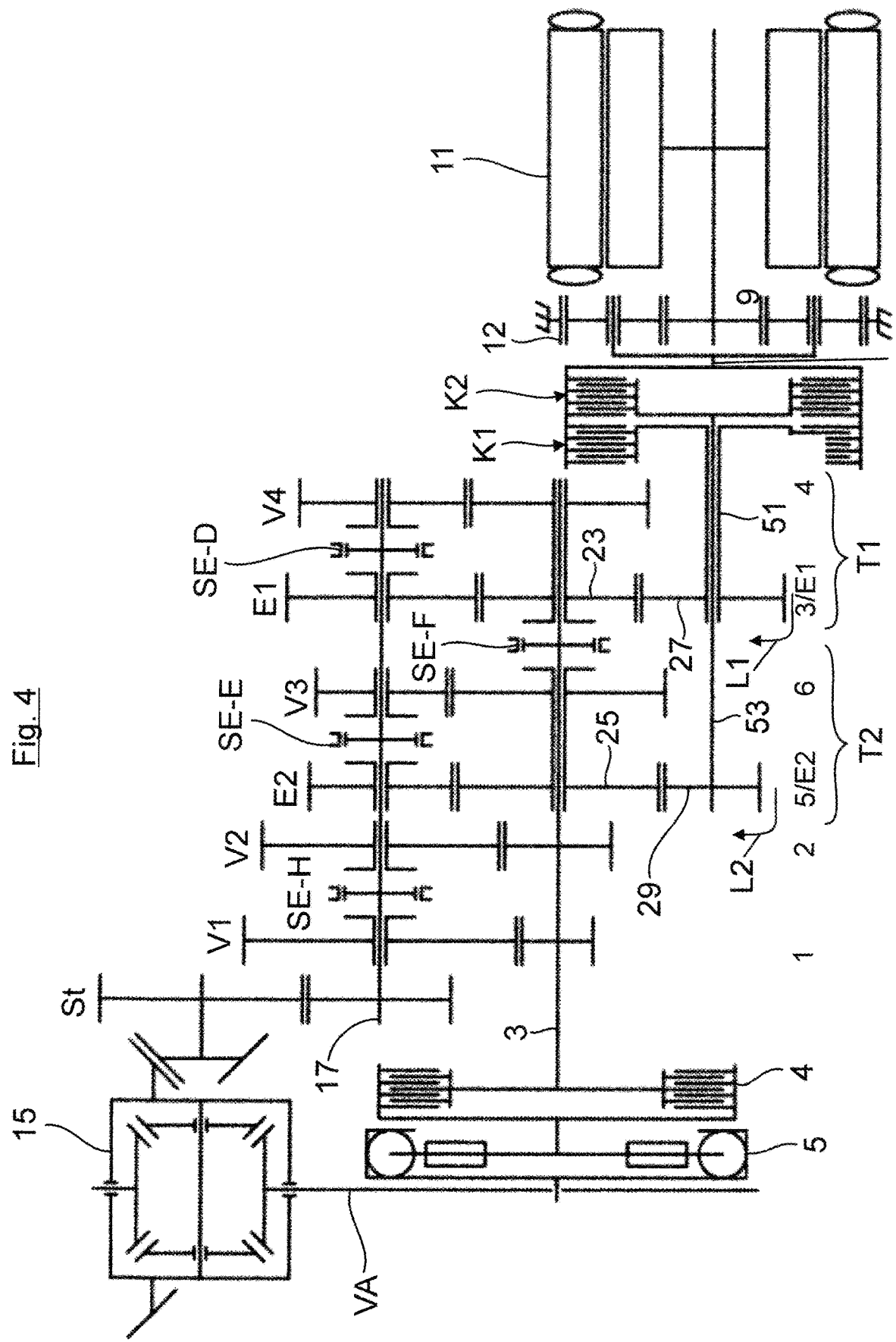
FIG. 4 shows a modification of FIG. 2.

In FIG. 4, electric motor 11 is no longer connected to transmission 1 on the power takeoff side (as in FIGS. 1 to 3), and is instead connected to transmission 1 on the drive side. With such a drive-side tie-in, the electric motor-side gear wheels 27, 29 of hybrid gear planes E1 and E2 no longer mesh with the power takeoff-side gear wheels 19, 21 of hybrid gear planes E1 and E2, but with the drive-side gear wheels 23, 25 of hybrid gear planes E1 and E2.

In FIGS. 1 to 4, an electric motor reverse gear is provided, in which electric motor 11 is to be operated in the reverse direction.

The invention claimed is:

1. A hybrid drive train for a hybrid-drive vehicle, comprising:
   a transmission, in particular a manual transmission, which can be shifted into different gear ratios by shifting components, and which can be drivingly connected to an internal combustion engine via an internal combustion engine shaft, to an electric motor via an electric motor shaft, and to at least one vehicle axle via an output shaft, wherein the internal combustion engine shaft and a power takeoff shaft that is drivingly connected to the output shaft can be connected via spur gear wheel sets, which can be selected by the shifting components and each of which forms a gear plane, wherein the gear planes include a first and a second hybrid gear plane, each of which can additionally be drivingly connected to the electric motor shaft, and wherein the electric motor can be connected to the internal combustion engine via the first hybrid gear plane, forming a first load path, and can be connected to the internal combustion engine via the second hybrid gear plane, forming a second load path, while at the same time, the power takeoff shaft connected to the output shaft is decoupled from the respective load path, wherein the first and second hybrid gear planes each have a power takeoff-side gear wheel arranged on the power takeoff shaft, a drive-side gear wheel arranged on the internal combustion engine shaft, and an electric motor-side gear wheel arranged coaxially to the electric motor shaft, and wherein the electric motor-side gear wheel, in particular, is rotationally mounted as an idler gear wheel and can be decoupled from the electric motor shaft or coupled thereto by the shifting component, wherein immediately adjacent to each hybrid gear plane is an additional gear plane, which is not tied to the electric motor shaft and which has a power takeoff-side idler gear wheel that is mounted rotationally on the power takeoff shaft and can be coupled to the power takeoff shaft by a shifting component, and wherein in particular the shifting component arranged on the power takeoff shaft can be shifted bilaterally and is arranged in the axial direction between the power takeoff-side idler gear wheels of the respective hybrid gear plane, mounted rotatably on the power takeoff shaft, and the associated additional gear plane, wherein in a neutral position, the shifting component is decoupled from the hybrid gear plane and from the additional gear plane, and the shifting component either, in a first shifting position, couples the power takeoff-side idler gear wheel of the additional gear plane to the power takeoff shaft or, in a second shifting position, couples the power takeoff-side idler gear wheel of the hybrid gear plane to the power takeoff shaft.

2. The drive train according to claim 1, wherein the shifting component arranged on the electric motor shaft can be shifted bilaterally and is arranged between the electric motor-side idler gear wheels of the two hybrid gear planes in the axial direction, wherein in a neutral position, the shifting component is decoupled from the two hybrid gear planes, and either in a first shifting position, the shifting component couples the idler gear wheel of the first hybrid gear plane to the electric motor shaft, or in a second shifting position, said shifting component couples the idler gear wheel of the second hybrid gear plane to the electric motor shaft.

3. The drive train according to claim 1, wherein the electric motor shaft has no fixed gear wheels of the spur gear wheel sets that form the gear planes arranged on said electric motor shaft in a torque-proof manner.

4. The drive train according to claim 1, wherein the power takeoff shaft is connected to the output shaft via a spur gear stage, and wherein all of the gear planes are located between the spur gear stage and the electric motor in the axial direction, and/ wherein the first and second hybrid gear planes are arranged directly axially adjacent to the electric motor.

5. The drive train according to claim 1, wherein the power takeoff-side gear wheel of the first and second hybrid gear planes, arranged on the power-takeoff shaft, is an idler gear wheel, which can be coupled to or decoupled from the power takeoff shaft by a shifting component, and wherein the drive-side gear wheel of the first and second hybrid gear planes, arranged on the internal combustion engine shaft, is an idler gear wheel, which can be coupled to the internal combustion engine shaft by a shifting component.

6. The drive train according to claim 5, wherein the shifting component arranged on the power takeoff shaft can be shifted bilaterally and is arranged between the power takeoff-side idler gear wheels of the two hybrid gear planes in the axial direction, wherein the shifting component either, in a first shifting position, couples the power takeoff-side idler gear wheel of the first hybrid gear plane to the power takeoff shaft or, in a second shifting position, couples the power takeoff-side idler gear wheel of the second hybrid gear plane to the power takeoff shaft.

7. The drive train according to claim 5, wherein the two hybrid gear planes are components of a common partial transmission, which can be decoupled from the internal combustion engine and from the power takeoff side, during transmission operation and wherein, in particular in the partial transmission, the drive-side idler gear wheels of the two hybrid gear planes, arranged on the internal combustion engine shaft, are arranged together in a torque-proof manner on a hollow shaft, which is rotationally mounted coaxially on the internal combustion engine shaft and can be coupled to the internal combustion engine shaft via exactly one shifting component.

8. The drive train according to claim 1, wherein the first hybrid gear plane and the associated additional gear plane form a first partial transmission, and wherein the second hybrid gear plane and the associated additional gear plane form a second partial transmission, and wherein the partial transmission can be decoupled from the drive train, during transmission operation, and in that in particular in each of the partial transmissions, the additional gear plane includes a drive-side idler gear wheel rotatably mounted on the internal combustion engine shaft, which idler gear wheel can be coupled to the internal combustion engine shaft by a shifting component, and wherein in particular the idler gear wheels of the hybrid gear plane and of the additional gear plane, rotatably mounted on the internal combustion engine shaft, are arranged in a torque-proof manner on a drive-side hollow shaft, which is rotatably mounted coaxially on the internal combustion engine shaft and can be coupled to the internal combustion engine shaft via exactly one shifting component.

9. The drive train according to claim 8, wherein the shifting component arranged on the internal combustion engine shaft can be shifted bilaterally and is arranged between the drive-side hollow shafts of the two partial transmissions in the axial direction, wherein the shifting component, in a neutral position, is decoupled from the two hollow shafts, and the shifting component either, in a first shifting position, couples the drive-side hollow shaft of the first partial transmission to the internal combustion engine shaft or, in a second shifting position, couples the drive-side hollow shaft of the second partial transmission to the internal combustion engine shaft.

10. The drive train according to claim 1, wherein the electric motor shaft is connected via a first shifting component to the first hybrid plane and via a second shifting component to the second hybrid plane.

11. The drive train according to claim 10, wherein the electric motor-side gear wheel of the first hybrid plane is arranged, in particular torque-proof, on a hollow shaft which is coaxial to the electric motor shaft, and in particular in that the hollow shaft can be connected via the first shifting component, in particular a clutch, to the electric motor shaft, and wherein the gear wheel of the second hybrid plane is arranged in a torque-proof manner on a solid shaft guided coaxially through the hollow shaft, and wherein the solid shaft can be connected to the electric motor shaft via the second shifting component, in particular a clutch.

12. The drive train according to claim 11, wherein the first shifting component is a one-way clutch, and in that the electric motor-side gear wheel of the first hybrid gear plane can be connected via the one-way clutch to the hollow shaft that is connected in a torque-proof manner to the electric motor shaft, and wherein the one-way clutch is associated with a shifting component, wherein in a first shifting position, the shifting component permits a transmission of torque from the electric motor shaft to the hollow shaft and prevents such transmission in the opposite direction, and in a second shifting position said shifting component permits the transmission of torque in both directions.

13. The drive train according to claim 10, wherein the second shifting component is a clutch with which the solid shaft can be connected to the electric motor shaft, wherein in particular an outer disk carrier of the clutch is fixedly connected both to the electric motor shaft and to the hollow shaft.

14. A hybrid drive train for a hybrid-drive vehicle, comprising:
a transmission, in particular a manual transmission, which can be shifted into different gear ratios by shifting components, and which can be drivingly connected to an internal combustion engine via an internal combustion engine shaft, to an electric motor via an electric motor shaft, and to at least one vehicle axle via an output shaft, wherein the internal combustion engine shaft and a power takeoff shaft that is drivingly connected to the output shaft can be connected via spur gear wheel sets, which can be selected by the shifting components and each of which forms a gear plane, wherein the gear planes include a first and a second hybrid gear plane, each of which can additionally be drivingly connected to the electric motor shaft, and wherein the electric motor can be connected to the internal combustion engine via the first hybrid gear plane, forming a first load path, and can be connected to the internal combustion engine via the second hybrid gear plane, forming a second load path, while at the same time, the power takeoff shaft connected to the output shaft is decoupled from the respective load path, wherein the first and second hybrid gear planes each have a power takeoff-side gear wheel arranged on the power takeoff shaft, a drive-side gear wheel arranged on the internal combustion engine shaft, and an electric motor-side gear wheel arranged coaxially to the electric motor shaft, and wherein the electric motor-side gear wheel, in particular, is rotationally mounted as an idler gear wheel and can be decoupled from the electric motor shaft or coupled thereto by the shifting component, wherein the power takeoff-side gear wheel of the first and second hybrid gear planes, arranged on the power-takeoff shaft, is an idler gear wheel, which can be coupled to or decoupled from the power takeoff shaft by a shifting component, and wherein the drive-side gear wheel of the first and second hybrid gear planes, arranged on the internal combustion engine shaft, is an idler gear wheel, which can be coupled to the internal combustion engine shaft by a shifting component, wherein the two hybrid gear planes are components of a common partial transmission, which can be decoupled from the internal combustion engine and from the power takeoff side, during transmission operation and wherein, in particular in the partial transmission, the drive-side idler gear wheels of the two hybrid gear planes, arranged on the internal combustion engine shaft, are arranged together in a torque-proof manner on a hollow shaft, which is rotationally mounted coaxially on the internal combustion engine shaft and can be coupled to the internal combustion engine shaft via exactly one shifting component.

15. A hybrid drive train for a hybrid-drive vehicle, comprising:
a transmission, in particular a manual transmission, which can be shifted into different gear ratios by shifting components, and which can be drivingly connected to an internal combustion engine via an internal combustion engine shaft, to an electric motor via an electric motor shaft, and to at least one vehicle axle via an output shaft, wherein the internal combustion engine shaft and a power takeoff shaft that is drivingly connected to the output shaft can be connected via spur gear wheel sets, which can be selected by the shifting components and each of which forms a gear plane, wherein the gear planes include a first and a second hybrid gear plane, each of which can additionally be drivingly connected to the electric motor shaft, and wherein the electric motor can be connected to the internal combustion engine via the first hybrid gear plane, forming a first load path, and can be connected to the internal combustion engine via the second hybrid gear plane, forming a second load path, while at the same time, the power takeoff shaft connected to the output shaft is decoupled from the respective load path, wherein the electric motor shaft is connected via a first shifting component to the first hybrid plane and via a second shifting component to the second hybrid plane, wherein the electric motor-side gear wheel of the first hybrid plane is arranged, in particular torque-proof, on a hollow shaft which is coaxial to the electric motor shaft, and in particular in that the hollow shaft can be connected via the first shifting component, in particular a clutch, to the electric motor shaft, and wherein the gear wheel of the second hybrid plane is arranged in a torque-proof manner on a solid shaft guided coaxially through the hollow shaft, and wherein the solid shaft can be connected to the electric motor shaft via the second shifting component, in particular a clutch, wherein the first shifting component is a one-way clutch, and in that the electric motor-side gear wheel of the first hybrid gear plane can be connected via the one-way clutch to the hollow shaft that is connected in a torque-proof manner to the electric motor shaft, and wherein the one-way clutch is associated with a shifting component, wherein in a first shifting position, the shifting component permits a transmission of torque from the electric motor shaft to the hollow shaft and prevents such transmission in the opposite direction, and in a second shifting position said shifting component permits the transmission of torque in both directions.

* * * * *